(No Model.)

W. LAHMEYER.
CIRCUIT AND SWITCH FOR ELECTRIC MOTORS.

No. 463,605. Patented Nov. 17, 1891.

Witnesses:
Robert B. Seward
L. M. Egbert

Inventor:
Wilhelm Lahmeyer,
by his attorneys
Brown & Seward

UNITED STATES PATENT OFFICE.

WILHELM LAHMEYER, OF FRANKFORT-ON-THE-MAIN, GERMANY, ASSIGNOR TO W. LAHMEYER & CO., OF SAME PLACE.

CIRCUIT AND SWITCH FOR ELECTRIC MOTORS.

SPECIFICATION forming part of Letters Patent No. 463,605, dated November 17, 1891.

Application filed March 26, 1891. Serial No. 386,470. (No model.) Patented in Germany March 3, 1889, No. 55,543.

*To all whom it may concern:*

Be it known that I, WILHELM LAHMEYER, a subject of the Emperor of Germany, residing at Frankfort-on-the-Main, Germany, have invented a new and useful Improvement in Circuits and Switches for Electric Motors, (for which I have obtained patent in Germany dated March 3, 1889, No. 55,543,) of which the following is a specification.

This invention consists in certain improvements hereinafter described and claimed in electric motors, which will enable them to start with the greatest power and at the same time avoid burning the windings of the armature by an excess of current. The means by which this object is attained consist in a special construction of the armature having two independent coils and in a new method of switching the current which is conducted from the generator so as to induce by its whole strength the electro-magnets for starting the engine and to cut it off afterward entirely and have the electro-magnets induced by a current-generator in the second coil of the armature having far less windings and its coil being on the same shaft as the main coil, which shaft is rotated by the principal current passing through the main coil. It appears that the armature is somewhat like the armature of a transformer engine for converting a continuous current of high tension into one of low tension, one part of the machine acting as an electric motor, the other as an electric generator; and in order that my invention may be fully understood I will describe an embodiment of it and the manner it is operated.

Figure 1:
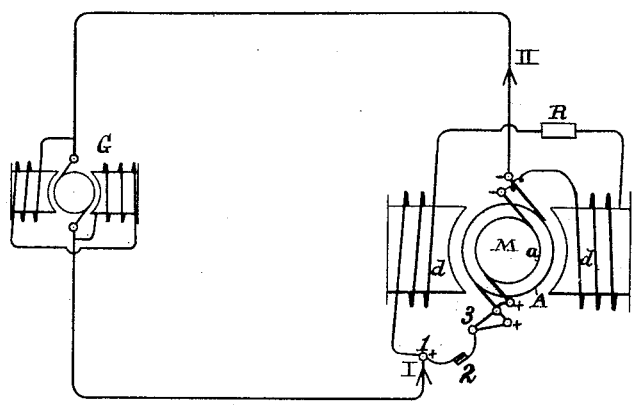
Figure 2:
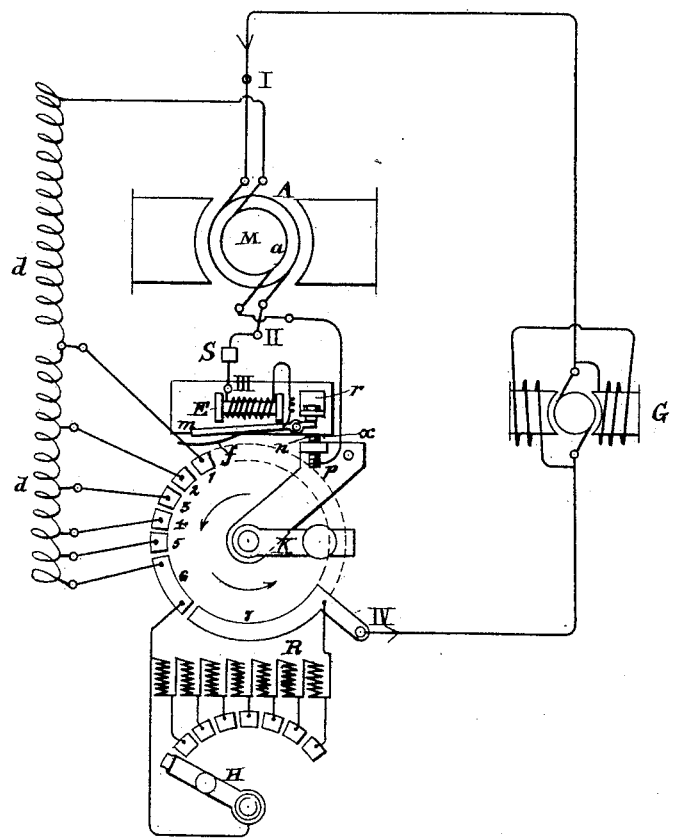

Figure 1 shows a general survey of the way of switching the two circuits. Fig. 2 shows the same, and besides indicates the different apparatuses needed to practically work my invention.

G is the dynamo generating the current which drives the electric motor M. On the shaft of the latter there are fixed two coils A and a.

d d are the electro-magnets common to both coils.

A is the primary coil, which will rotate the shaft as soon as it receives current.

a is the secondary coil in which a current will be generated by the said rotation.

R is a regulating-resistance.

2 is a contact.

In order to start the motor, the contact 2 is broken and the current passes through the circuit. G I 1 d R d a 3 A II—that is to say, the entire current—passes through both coils of the electro-magnet and through both coils of the armature. The action between the current in the primary coil and the pole-pieces will cause the armature to rotate notwithstanding the opposite but weak action of the secondary coil.

The engine will run as a common electric motor whose field-magnets are energized by the main circuit. The great advantage for the purpose of starting is by this means gained, that as the strength of the current increases it gives rise to stronger magnetism, and thereby, as is necessary, greater driving-power. The resistance to conduction offered by the coils of the field-magnets prevents the current from being too great at first, and by reason of the auto-induction of the coils of these magnets the current does not reach its full strength immediately, but only by degrees. As soon as the machine has obtained its speed the contact 2 is closed and the coils of the electro-magnets will be fed now by the current generated in the secondary armature a, lying in the circuit a d R d 1 2 3. The portion 1 3 is common to both circuits, the main current from G and the exciting-current from a.

Fig. 2 illustrates the different arrangements which are necessary to break the currents, regulate the resistances, and switch the electro-magnets from the main circuit into the special inducing-circuit. On behalf of greater clearness the coils d d of the electro-magnets are represented in a developed state, showing better their subsequent portions. No regard is had thereby to the real position of the same on both sides of the armature, this being unessential for showing the switching. G is the generator-dynamo again, a and A the two coils of the motor-armature M. The coils d are divided into several portions, which are connected with contact-pieces 1 2

3 4 5 6, and can be switched into the inducing or exciting circuit one after the other by means of a contact-arm K. E is a relay lying in the circuit of the primary coil and having an armature m, which when attracted closes the main circuit at x. S is a lead safety connection. R is a resistance-board whose coils may be shunted out off the circuit by the contact-arm H.

Now if the machine is to be started the arm K will be moved as far as to press against a spring f and raise thereby the armature m to close the main circuit at x by contact n. The current will flow in the direction G I A II S III E m x n p a d d 6 R 7 IV. The armature m is held now by the magnetism of the induced relay E and the arm K is moved onto the contact-piece 1. Another circuit is closed now—viz., a d 1 K p a. If the arm K proceeds both the coils d will come into this circuit by and by, and the resistance R will be switched in it when the arm K is turned to touch the contact 7, when the circuit will be a d d 6 R 7 K p a. The field-magnets are fed now by this circuit, whose current is derived from the secondary coil a of the motor-armature. Then, of course, the resistance R is short-circuited by turning the lever H to the right, and the resistance can be used now for the regulation of the inducing-current. The twofold employment of the regulator R as a check-resistance at starting and as an ordinary governing resistance in working is rendered possible by the fact that the secondary circuit furnishes a strong current with low tension.

The regulator of a closed secondary-circuit machine would naturally not be able to shunt out the primary current within a short time. In the meantime the regulator R when shunted in without employment can remain short-circuited if the number of divisions in the coils of the field-magnets is sufficiently large. Beyond this an alteration is possible of such a kind that the lever in the position in which it raises the armature m also touches the circuit-completing surface 1, or that the point 1 is in permanent electrical connection with p. The primary current is then from the outset excluded from the path through a and the first division of d, which form a circuit from the beginning themselves. The wire of the armature does not, then, need to be arranged for the temporary requirements of the primary currents.

What I claim as my invention, and desire to secure by Letters Patent, is—

1. In an electric motor, the combination, with the motor-armature a and the coils of the field-magnets, of a secondary armature fixed on the same shaft and means of switching the driving-current through both the armature-coils and the magnet-coils, and to switch the driving-current through the main armature-coil and the current from the secondary armature-coil through the coils of the electro-magnets, substantially as and for the purpose specified.

2. The combination, with the motor-armature A and the secondary armature a, of contacts 1 2 3 4 5 6, corresponding to subsequent portions of the magnet-coils, and a contact-arm K being in connection with the secondary coil, substantially as and for the purpose specified.

In testimony whereof I have signed my name to this specification in the presence of two subscribing witnesses.

WILHELM LAHMEYER.

Witnesses:
ANTON KRAUTER,
FRANZ HASSLACHER.